United States Patent
Singh et al.

(10) Patent No.: US 10,497,039 B1
(45) Date of Patent: Dec. 3, 2019

(54) TECHNIQUES FOR DYNAMIC VARIATIONS OF A SEARCH QUERY

(71) Applicant: Amazon Technologies, Inc., Seattle, WA (US)

(72) Inventors: Sachin Birendra Singh, Sammamish, WA (US); Deept Kumar, Seattle, WA (US); Luis Antonio Diniz Fernandes de Morais Sarmento, Sammamish, WA (US); Ismail Baha Tutar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 862 days.

(21) Appl. No.: 14/866,490

(22) Filed: Sep. 25, 2015

(51) Int. Cl.
| | |
|---|---|
| G06Q 30/00 | (2012.01) |
| G06Q 30/06 | (2012.01) |
| G06F 16/248 | (2019.01) |
| G06F 16/242 | (2019.01) |
| G06F 16/9535 | (2019.01) |
| G06F 16/2457 | (2019.01) |

(52) U.S. Cl.
CPC ....... *G06Q 30/0625* (2013.01); *G06F 16/248* (2019.01); *G06F 16/2425* (2019.01); *G06F 16/24575* (2019.01); *G06F 16/9535* (2019.01)

(58) Field of Classification Search
CPC .................................................. G06Q 30/0625
USPC ..................................... 705/26.1–27.2, 26.62
See application file for complete search history.

(56) References Cited

U.S. PATENT DOCUMENTS

| | | | | |
|---|---|---|---|---|
| 2012/0310973 | A1* | 12/2012 | Zhong | G06F 17/30867 707/769 |
| 2014/0188845 | A1* | 7/2014 | Ah-Soon | G06F 17/30566 707/722 |
| 2015/0356188 | A1* | 12/2015 | Konik | G06F 17/30867 707/706 |

OTHER PUBLICATIONS

Speretta, M. (2005). Personalizing search based on user search histories (Order No. 1429000). Available from ProQuest Dissertations & Theses Global. (304994270). Retrieved from https://search.proquest.com/docview/304994270?accountid=14753 (Year: 2005).*

* cited by examiner

*Primary Examiner* — Abby J Flynn
*Assistant Examiner* — Arielle E Weiner
(74) *Attorney, Agent, or Firm* — Kilpatrick Townsend & Stockton LLP

(57) ABSTRACT

Techniques are provided herein for utilizing a query variations engine. An attribute category for a search query may be identified from a search query history. A search query may be received from a user and a set of search results may be determined. A reduced set of search results may be generated from the set of search results based at least in part on the attribute category identified from the search query history. The user may be provided with the reduced set of search results.

19 Claims, 12 Drawing Sheets

TECHNIQUES FOR DYNAMIC VARIATIONS OF A SEARCH QUERY

BACKGROUND

It has become commonplace for users to obtain items from an electronic marketplace. As users search for these items, it can be difficult for the electronic marketplace provider to match applicable items to the user's search query. Traditional search engines often query a data store of items in order to determine a search result list for the user's search query. Often, the items in the search result list are scored based on a relevance score, where the relevancy score is determined using information about the item and the search query. The search result list is presented with items appearing in an order corresponding to the relevance score. There is often duplicity in search result lists with respect to items that are, essentially, the same item, but offered in different sizes, quantities, fragrances, or the like. These duplicate items clutter the search result list and may cause delay in the search process by forcing the user to perform various comparisons between search result list entries in order to find the exact item he wishes to procure. As a result, current techniques can lead to a frustrating user experience and lower conversion rates for the electronic marketplace provider.

BRIEF DESCRIPTION OF THE DRAWINGS

Various embodiments in accordance with the present disclosure will be described with reference to the drawings, in which.

DETAILED DESCRIPTION

Figure 1:
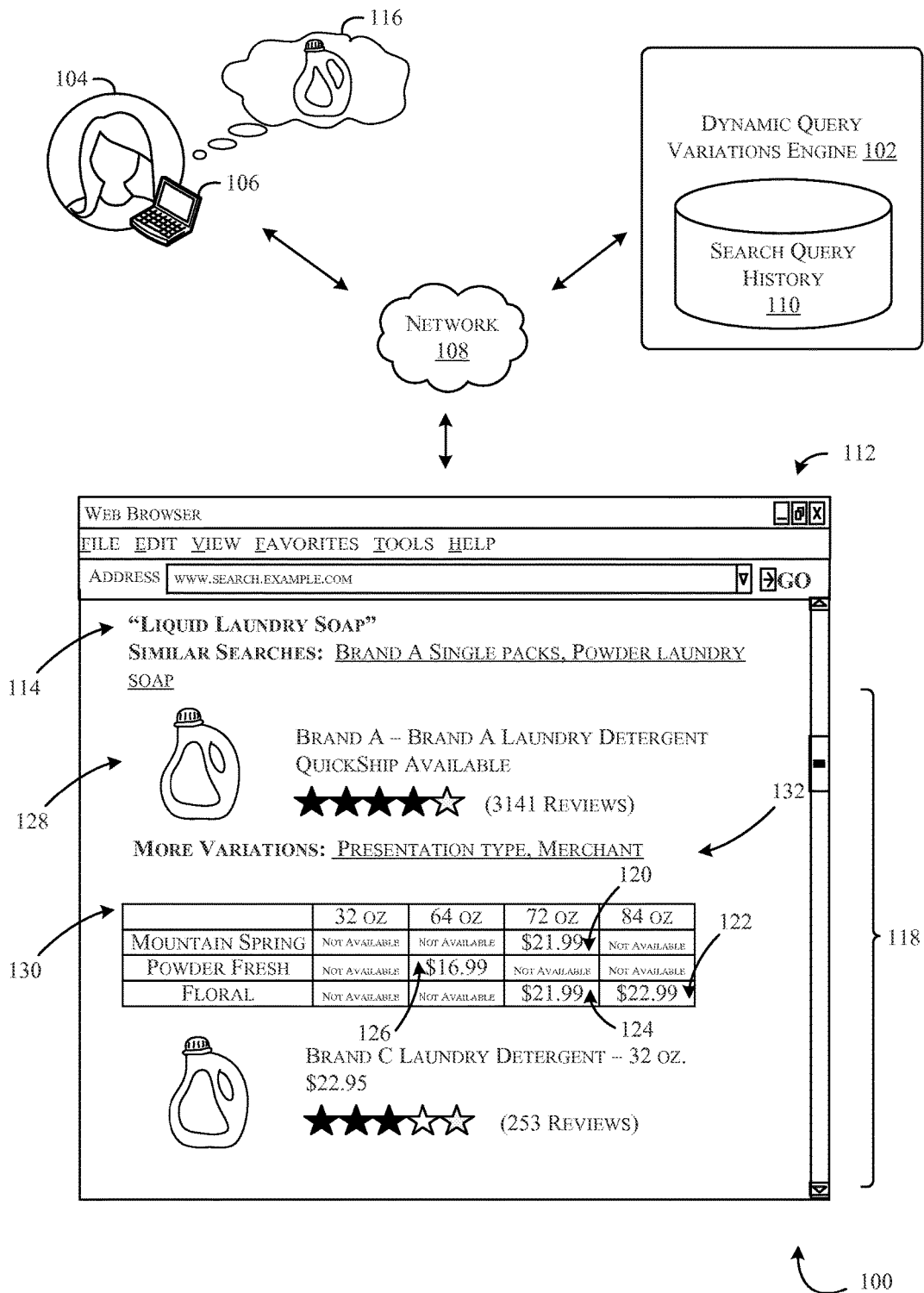
FIG. 1 is a schematic diagram illustrating an example environment suitable for implementing aspects of a dynamic query variations engine, in accordance with at least one embodiment.

Techniques described herein are directed to dynamically condensing a set of search results provided on an electronic marketplace. An electronic marketplace, as used herein, is intended to refer to a computer-facilitated market for participants (e.g., buyers and sellers) to conduct transactions including commercial and/or financial transactions. An "item" is intended to refer to a product, a service, a sellable unit, or anything else that may be managed or otherwise physically or electronically stored as inventory. A "duplicate item" is intended to refer to an item included in a search result list that is substantially similar to another item included in the search result list, but that varies in one or more attribute categories. For example, an attribute category may pertain to size, quantity, fragrance, material (liquid, powder, cotton, metal), manufacturing process (organic/non-organic), color, shipping method, packaging method, offeror (merchant that offers the item), or the like. Thus, a 24 oz. bottle of laundry detergent and a 64 oz. bottle of laundry detergent may be considered duplicate items. As used throughout this disclosure, "dynamic" or "dynamically" is intended to refer to a process of altering a search result list at substantially a same time as the search result list is initially returned by a data store.

In at least one non-limiting example, the system may analyze a flow of previously-submitted user-specified search queries (e.g., a global search query history containing a portion of all of the search queries submitted by all users of an electronic marketplace) to identify a number of attribute categories that are most often utilized by users to narrow a search. It may be determined that users often submit a broad query for items (e.g., "laundry soap") followed by a subsequent query with narrowing scope (e.g., "laundry soap, mountain mist"), where the narrowing feature ("mountain mist") is related to a particular attribute category fragrance). By analyzing the flow of these search queries, the frequency at which narrowing search queries related to a particular attribute category (e.g., fragrance) may be determined. In a larger scale analysis of previously-submitted search queries, a number of these attribute categories may be identified, ranked, and associated with a search query using a search query profile. When a new search query is submitted by a user (e.g., "laundry soap") that has a number of duplicate items that are substantially the same item with varying attributes, a search query result list may be provided according to the search query profile. By using the search query profile, the search result list may be dynamically altered to group items having varying attributes in fewer search result entries. For example, a laundry detergent provided in various fragrances and unit sizes may be provided in one search result entry for the laundry detergent family. At substantially the same time, information may be provided related to the varying attributes to the user (e.g., via a grid or other suitable graphical element). For example, prices corresponding to the items having varying fragrances and varying unit sizes may be provided via a grid or other suitable graphical element.

In at least one non-limiting example, the system may analyze a flow of previously-submitted user-specified search queries (e.g., an individual search query history containing a portion of all of the search queries submitted by a single user of an electronic marketplace) to identify a number of attribute categories that are most often utilized by a particular user to narrow a search. It may be determined that the user often narrows his searches based on unit size. When a new search query is submitted by the user (e.g., "laundry soap") that has a number of duplicate items that are substantially the same item with varying attributes, a search query result list may be provided according to the identified attribute categories. By using the identified attribute categories, the search result list may be dynamically altered to group items having varying attributes in fewer search result entries. For example, a laundry detergent provided in various fragrances and unit sizes may be provided in one search result entry for the laundry detergent family. At substantially the same time, information may be provided related to the varying attributes to the user (e.g., via a grid or other suitable graphical element). For example, prices corresponding to the items having varying unit sizes may be provided via a grid or other suitable graphical element in accordance with the identified attribute category (unit size) for the user.

In at least one non-limiting example, the system may enable the user to "drill down" with respect to attribute categories. For example, items may be grouped as discussed above. The system may include a number of options adjacent to the grid described above. For example, the grid may display prices for item having various sizes. One example, option provided may be an option for included information regarding fragrances. Upon selection of this option, the system may update the grid to reflect information (prices) for both unit size and fragrance. In this manner, the user may view the various information of the items without having to search through a result list, manually comparing duplicate items.

FIG. 1 is a schematic diagram illustrating an example environment 100 suitable for implementing aspects of a dynamic query variations engine 102, in accordance with at least one embodiment. For example, a user 104 may utilize an electronic device (e.g., laptop 106) and network 108 to frequent an electronic marketplace. The network 108, and any network described herein, can include any appropriate network, including an intranet, the Internet, a cellular network, a local area network, a wide area network, or any other such network or combination thereof. The communication may be transmitted electronically or physically communicated over, for example, a telephone (e.g., using an automated service).

In at least one non-limiting example, the dynamic query variations engine 102 may maintain a search query history 110 that includes previously-submitted search queries submitted by various users of the electronic marketplace. The dynamic query variations engine 102 may analyze the search query history 110 to identify a number of attribute categories that are typically utilized by the user 104, or the global community of electronic marketplace users, to narrow a search.

In accordance with at least one embodiment, the dynamic query variations engine 102 may determine that users that submit a search query (e.g., "laundry soap"), often submit a subsequent related search query (e.g., "laundry soap, 32 oz") to narrow the search according to a particular attribute category (e.g., unit size). The narrowing feature of a subsequent search query (e.g., "32 oz") may be mapped to a particular attribute category (e.g., unit size). Additional attribute categories (e.g., fragrance) for items may be identified using the search query history and each identified attribute category may be ranked according to how often it is utilized to narrow searches. For example, by analyzing search query history, it may be determined that users often narrow a particular query most often by adding words to the query that relate to the attribute category "unit size," followed by adding words related to the attribute category "fragrance," followed by adding words relating to the merchant that is offering the item. The attribute categories rankings for the query may be stored for later use.

As a non-limiting example, the user 104 may utilize an interface 112 provided by a dynamic query variations engine 102 to submit a search query 114 (e.g., "liquid laundry soap") for an item offered through the electronic marketplace (e.g., laundry soap 116). The search query may be utilized by the dynamic query variations engine 102 to determine a search result list 118. The dynamic query variations engine 102 may identify a search query profile related to "liquid laundry soap" that includes attribute category rankings. The dynamic query variations engine 102 may utilize the search query profile to preempt a narrowed search by the user. As example, the dynamic query variations engine 102 may determine that the search query 114 is most often narrowed using a subsequent query related to "size," and slightly less often narrowed using a subsequent query related to "fragrance."

The dynamic query variations engine 102 may utilize the ranked attribute categories to dynamically condense the search result list 118 by grouping search result entries into fewer entries according to the ranked attribute categories. Accordingly, items that would normally be displayed as separate search result list entries (e.g., items represented by listing 120, listing 122, listing 124, and listing 126) may be condensed into fewer search result list entries (e.g., single search result list entry 128) using a graphical element 130 (e.g., a grid). The user may be provided an option 132 to select other attributes (e.g., presentation type), merchant offeror (e.g., offered by the provider of the electronic marketplace, etc.) to update the display of the graphical element 128. In this manner, the user 104 is provided a user-friendly experience, as the condensed search result list allows the user 104 to more quickly identify the sought-after item without having to scroll through a lengthy search result list or submit another search query to narrow the scope of the search result list.

Figure 2:
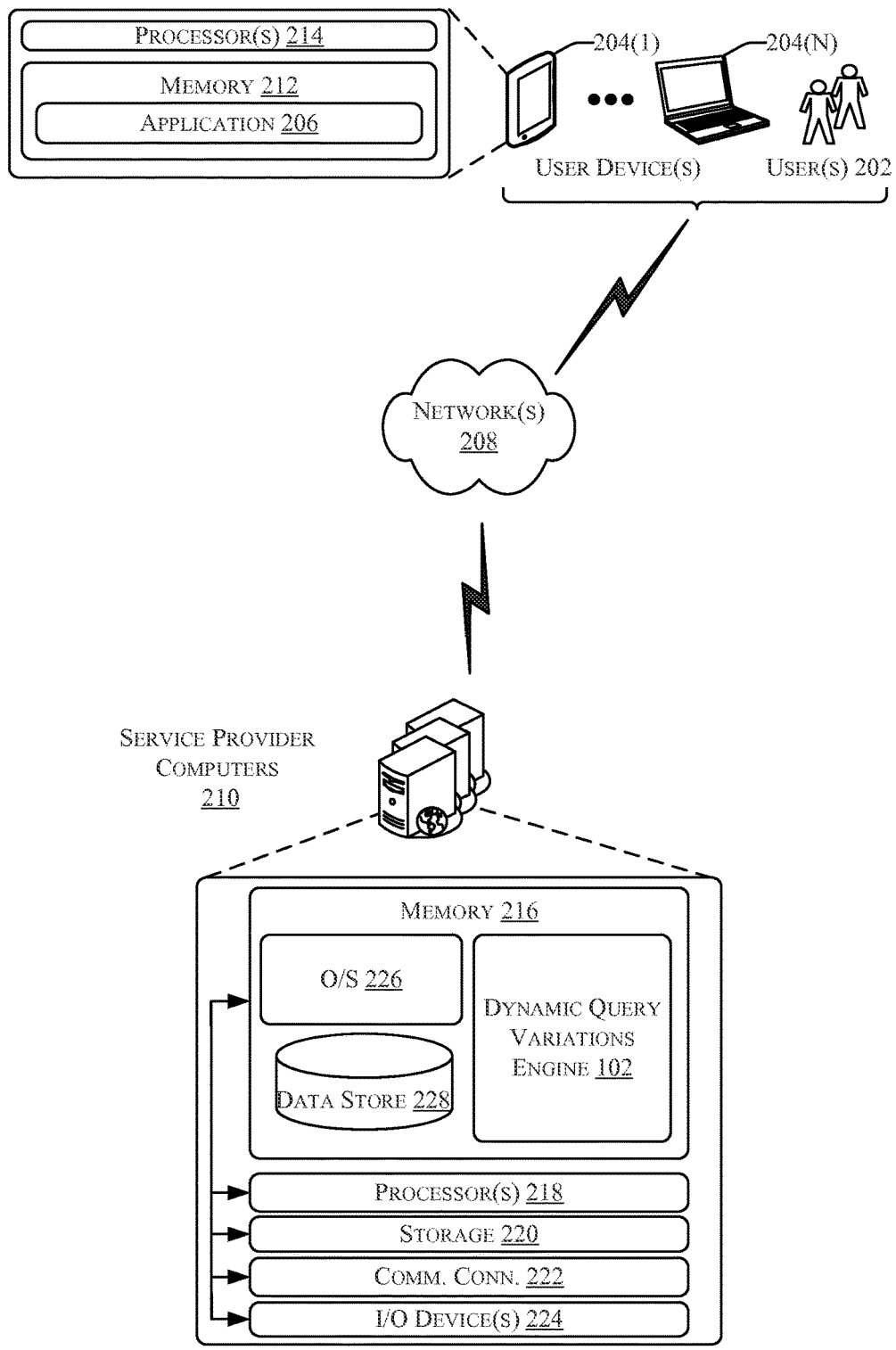
FIG. 2 is an example architecture of the dynamic query variations engine, in accordance with at least one embodiment.

FIG. 2 is an example architecture 200 of the dynamic query variations engine 102 of FIG. 1, in accordance with at least one embodiment. In architecture 200, one or more users 202 may utilize user computing devices 204(1)-(N) (collectively, user computing devices 204, e.g., the laptop 106 of FIG. 1) to access application 206 or a user interface accessible through the application 206 via one or more networks 208 (e.g., the network 108 of FIG. 1). In some aspects, the application 206 may be hosted, managed, and/or provided by a computing resources service or service provider, such as by utilizing one or more service provider computers 210. The one or more service provider computers 210 may, in some examples, provide computing resources such as, but not limited to, client entities, low latency data storage, durable data storage, data access, management, virtualization, cloud-based software solutions, electronic content performance management, etc. The one or more service provider computers 210 may also be operable to provide web hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks, and other private and/or public networks. While the illustrated example represents the users 202 accessing the application 206 over the networks 208, the described techniques may equally apply in instances where the users 202 interact with the service provider computers 210 via the one or more user computing devices 204 over a landline phone, via a kiosk, or in any other suitable manner. It should be appreciated that the described techniques may apply in other client/server arrangements (e.g., set-top boxes, etc.), as well as in non-client/server arrangements (e.g., locally stored applications, etc.).

As described briefly above, the application 206 may allow the users 202 to interact with the service provider computers 210 such as to access information associated with selling items via an electronic marketplace. The one or more service provider computers 210, perhaps arranged in a cluster of servers or as a server farm, may host the application 206 and/or cloud-based software services. Other server architectures may also be used to host the application 206 and/or cloud-based software services. The application 206 may be capable of handling requests from many users 202 and serving, in response, various user interfaces that can be rendered at the user computing devices 204 such as, but not limited to, perceived latency or the like. The application 206 can present any suitable type of website that supports user interaction, including search engine sites. As discussed above, the described techniques can similarly be implemented outside of the application 206, such as with other applications running on the user computing devices 204.

The user computing devices 204 (e.g., the laptop 106 of FIG. 1) may be any suitable type of computing device such as, but not limited to, a mobile phone, a smartphone, a personal digital assistant (PDA), a laptop computer, a desktop computer, a thin-client device, a tablet PC, an electronic book (e-book) reader, etc. In some examples, the user computing devices 204 may be in communication with the service provider computers 210 via the networks 208, or via other network connections. Additionally, the user computing devices 204 may be part of the distributed system managed by, controlled by, or otherwise part of the service provider computers 210.

In one illustrative configuration, the user computing devices 204 may include at least one memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user computing device, the memory 212 may be volatile (such as random access memory (RAM)) and/or non-volatile (such as read-only memory (ROM), flash memory, etc.). The user computing devices 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein including at least the perceived latency, such as via the application 206 or dedicated applications (e.g., smart phone applications, tablet applications, etc.). The application 206 may be configured to receive, store, and/or display a network page or other interface for interacting with the service provider computers 210. Additionally, the memory 212 may store access credentials and/or other user information such as, but not limited to, user IDs, passwords, and/or other user information. In some examples, the user information may include information for authenticating an account access request such as, but not limited to, a device ID, a cookie, an IP address, a location, or the like. Additionally, the memory 212 may store a set of parameters associated with a geo-fence (e.g., the geo-fence 124 of FIG. 1).

In some aspects, the service provider computers 210 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 210 may be in communication with the user computing devices 204 and/or other service providers via the networks 208 or via other network connections. The service provider computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the service provider computers 210 may include at least one memory 216 and one or more processing units (or processor(s)) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described.

The memory 216 may store program instructions that are loadable and executable on the processor(s) 218, as well as data generated during the execution of these programs. Depending on the configuration and type of service provider computers 210, the memory 216 may be volatile (such as RAM) and/or non-volatile (such as ROM, flash memory, etc.). The service provider computers 210 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 216 may include multiple different types of memory, such as SRAM, DRAM, or ROM.

The memory 216, the additional storage 220, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are all examples of computer storage media. Additional types of computer storage media that may be present in the service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 210 may also contain communications connection(s) 222 that allow the service provider computers 210 to communicate with a stored database, another computing device or server, user terminals and/or other devices on the networks 208. The service provider computers 210 may also include I/O device(s) 224, such as a keyboard, a mouse, a pen, a voice input device, a touch input device, a display, speakers, a printer, etc.

Turning to the contents of the memory 216 in more detail and will be described in further detail in FIG. 3, the memory 216 may include an operating system 226, one or more data stores 228, and/or one or more application programs, modules, or services for implementing the features disclosed herein including dynamic query variations engine 102 of FIG. 1.

Figure 3:
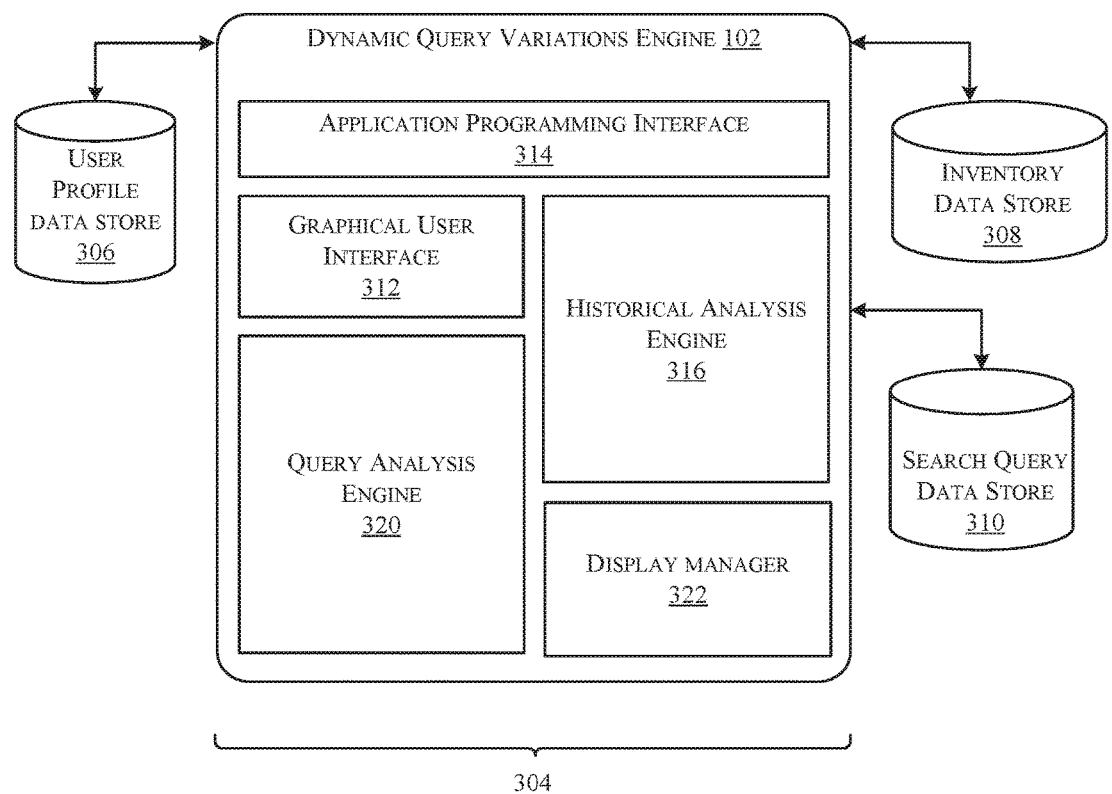
FIG. 3 is a schematic diagram of the dynamic query variations engine, in accordance with at least one embodiment.

FIG. 3 schematically illustrates an example computer architecture 300 for the dynamic query variations engine 102 of FIG. 1, including a plurality of modules 304 that may carry out various embodiments. The modules 304 may be software modules, hardware modules, or a combination thereof. If the modules 304 are software modules, the modules 304 can be embodied on a computer readable medium and processed by a processor in any of the computer systems described herein. It should be noted that any module or data store described herein, may be, in some embodiments, a service responsible for managing data of the type required to make corresponding calculations. The modules 304 may be configured in the manner suggested in FIG. 3 or the modules 304 may exist as separate modules or services external to the dynamic query variations engine 102. Any combination of modules 304 may be executed, in whole or in part, on service provider computers (e.g., service provider computers 210 of FIG. 2). Likewise, any combination of modules 304 may be executed, in whole or in part, on a user device (e.g., the user computing devices 204 of FIG. 2), for example, as part of an application executing on user device(s) (e.g., the application 206 of FIG. 2).

In the embodiment shown in the drawings, a user profile data store 306, an inventory data store 308, and a search query data store 310 are shown, although data can be maintained, derived, or otherwise accessed from various data stores, either remote or local to the dynamic query variations engine 102, to achieve the functions described herein. Some combination of the data stores depicted in FIG. 3 may be located on the service provider computers and/or may be located on the user device(s). The dynamic query variations engine 102, shown in FIG. 3, includes various modules such as a graphical user interface 312, an application programming interface 314, a historical analysis engine 316, a query analysis engine 320, and a display manager 322. Some functions of the modules 312, 314, 316, 320, and 322 are described below. However, for the benefit of the reader, a brief, non-limiting description of each of the modules is provided in the following paragraphs.

In accordance with at least one embodiment, a process is enabled for utilizing the dynamic query variations engine 102 of FIG. 1. For example, users (e.g., the users 202 of FIG. 2) may utilize the user device(s) (e.g., the user computing devices 204 of FIG. 2) to interact with service provider computers (e.g., the service provider computers 210 of FIG. 2) to provide search queries via, for example, a network page managed by service provider computers. As part of a search process, the users 202 may submit various search queries. These search queries are received by the dynamic query variations engine 102 via graphical user interface 312 and application programming interface 314, both components of the dynamic query variations engine 102. As a side, graphical user interface 312 and application programming interface 314 may be utilized in any suitable example described herein as a means for receiving by, or providing information by, dynamic query variations engine 102. These received search queries may be stored in the search query data store 310, or any data store suitable for storing such information. In another example, received search queries from a particular user may be stored in search query data store 310 and/or the user profile data store 306 as data related to a profile for the user.

In accordance with at least one embodiment, the historical analysis engine 316 may interact with the search query data store 310 to analyze a portion of the stored search queries. The historical analysis engine 316 may generate a search query profile for a particular search query. The historical analysis engine 316 may then analyze subsequent related search queries to identify a number of queries that relate to the particular search query. The subsequent related search queries may be parsed by the historical analysis engine 316 to determine a variation (e.g., a difference) between the originally submitted search query and a subsequent search query. The variation may be mapped to an attribute category based on, for example, a predetermined mapping. The attribute category may be associated with the search query profile and a count maintained that indicates how often a subsequent related search query contained a variation that relates to the attribute category. The historical analysis engine 316 may rank the various attribute categories of the query profile according to the count. For example, an attribute category that is associated with a higher count may receive a higher ranking than an attribute category that is associated with a lower count, in this manner, the historical analysis engine 316 may determine a ranked set of attribute categories that correspond to variations included in subsequent search queries.

In accordance with at least one embodiment, the historical analysis engine 316 may interact with the user profile data store 306 to analyze a portion of stored search queries associated with a particular user. The historical analysis engine 316, utilizing a similar process described above, may determine a number of attribute categories that relate to variations in search queries provided by a particular user. The attribute categories may be ranked according to the number of occurrences in which the user provides a variation in a subsequent search query that relates to a particular attribute category. In this manner, the historical analysis engine 316 may provide a ranked set of attribute categories associated with the user.

In accordance with at least one embodiment, a user (e.g., the user 104 of FIG. 1) may utilize an interface provided by the service provider computers (e.g., interface 112, a network page provided by the service provider computers) to enter a search query. The query analysis engine 320, a component of the dynamic query variations engine 102, may be configured to receive the search query. The query analysis engine 320 may execute the search query against the inventory data store 308, a data store responsible for storing inventory information of the various items offered on the electronic marketplace. Executing the search query may result in generation of a set of search results corresponding to separate items stored in inventory data store 308. Each item contained in inventory data store 308 may have various attributes corresponding to one or more attribute categories.

The query analysis engine 320 may analyze the search query to determine a related search query profile. The query analysis engine 320 may utilize the related search query profile to identify a set of ranked attribute categories. The query analysis engine 320 may group a number of the set of search results according to a particular attribute category of the set of ranked attribute categories. For example, if "size" corresponds to a highest ranked attribute category for the search result profile related to the submitted search query, the set of search results may be grouped according to size. Accordingly, an item of size 7 included in the search result list may be grouped with an item of size 8 also included in the search result list. In at least one non-limiting example, the query analysis engine 320 may generate a single entry corresponding to both items that includes information identifying the size variation in both items.

The display manager 322, a component of the dynamic query variations engine 102, may be configured to receive a search result list and associated information from query analysis engine 320. The display manager 322 may format the search result list and associated information in order to present the user 104 with a condensed search result list. The display, manager 322 may provide the user with an option corresponding to information (e.g., related to an additional attribute category) that is not currently displayed. The display manager 322 may be configured to receive a user-selection of the option. Upon receipt, the display manager 322 may reformat at least one entry of the search result list to provide information related to the user-selected option.

Figure 4:
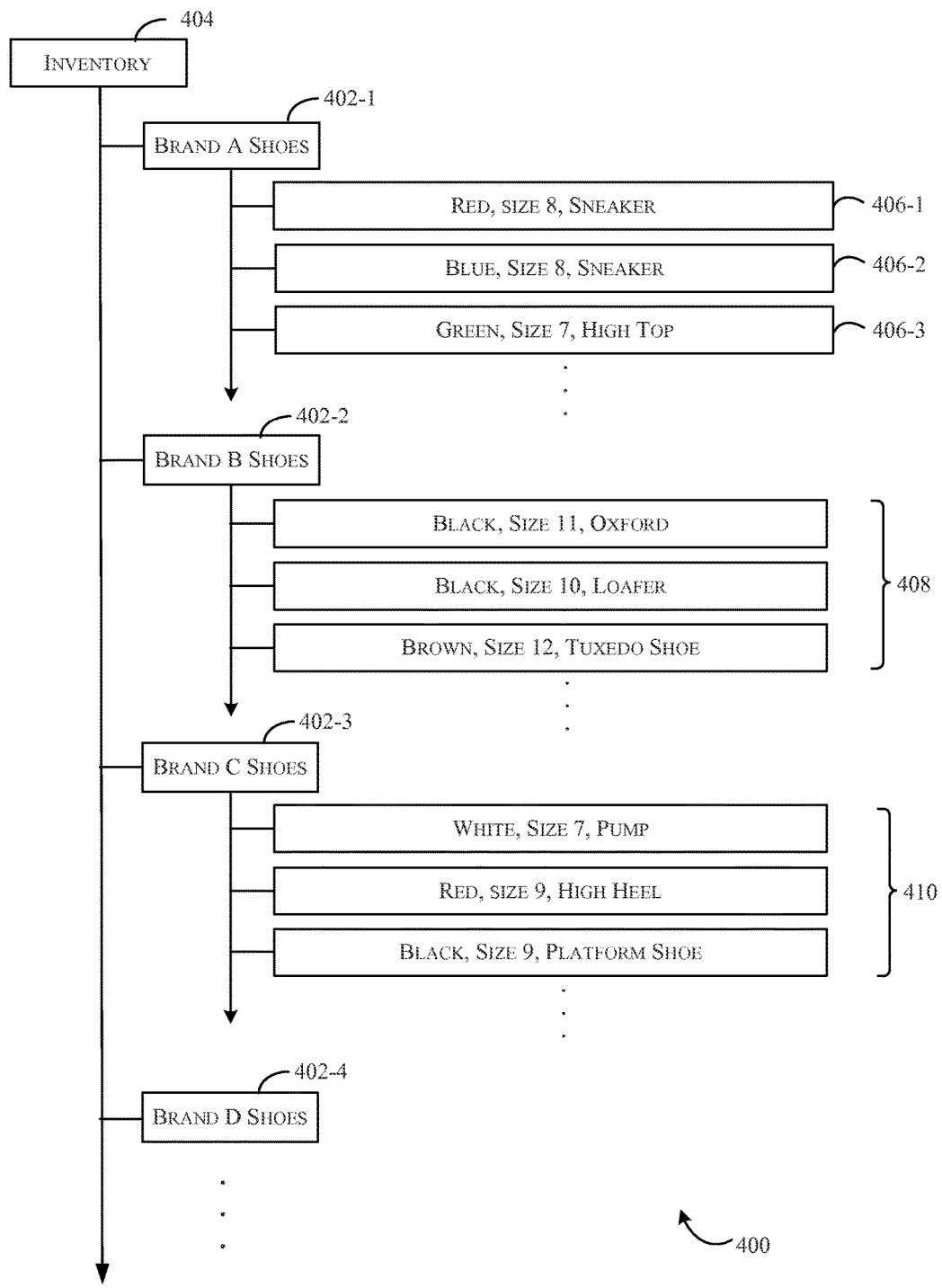
FIG. 4 is a schematic diagram illustrating an example data structure suitable for implementing aspects of the dynamic query variations engine, in accordance with at least one embodiment.

FIG. 4 is a schematic diagram illustrating an example data structure 400 suitable for implementing aspects of the dynamic query variations engine 102 of FIG. 1, in accordance with at least one embodiment. Data structure 400 may be utilized to store information related to individual items in inventory. For example, a parent object (e.g., parent object 402-1, parent object 402-2, parent object 402-3, and parent object 402-4; collectively, parent objects 402) may be stored in an inventory 404 (e.g., within inventory data store 308 of FIG. 3). Parent objects 402 are intended to be illustrative in nature; and it should be understood that more or fewer parent objects may be utilized depending on the inventory at hand.

In at least one embodiment, a parent object (e.g., parent object 402-1) may be associated with one or more child objects (e.g., child object 406-1, child object 406-2, and child object 406-3; collectively, child objects 406). A child object may be utilized to store attribute information related to a particular item in inventory. For example, child object 406-1 relates to a physical item (e.g., a specific red, size 8, sneaker) that is associated the parent object 402-1 (Brand A shoes). Similarly, child objects 408 relate to specific items that are associated with the parent object 402-2 (Brand B shoes) and child objects 410 relate to specific items that are associated with the parent object 402-3 (Brand C shoes). The number of child objects related to a parent object may vary depending on the inventory at hand. Each child object may include more or fewer attributes than depicted in FIG. 4. A "family," as used below, is intended to refer to a parent object and its corresponding child object(s).

Figure 5:
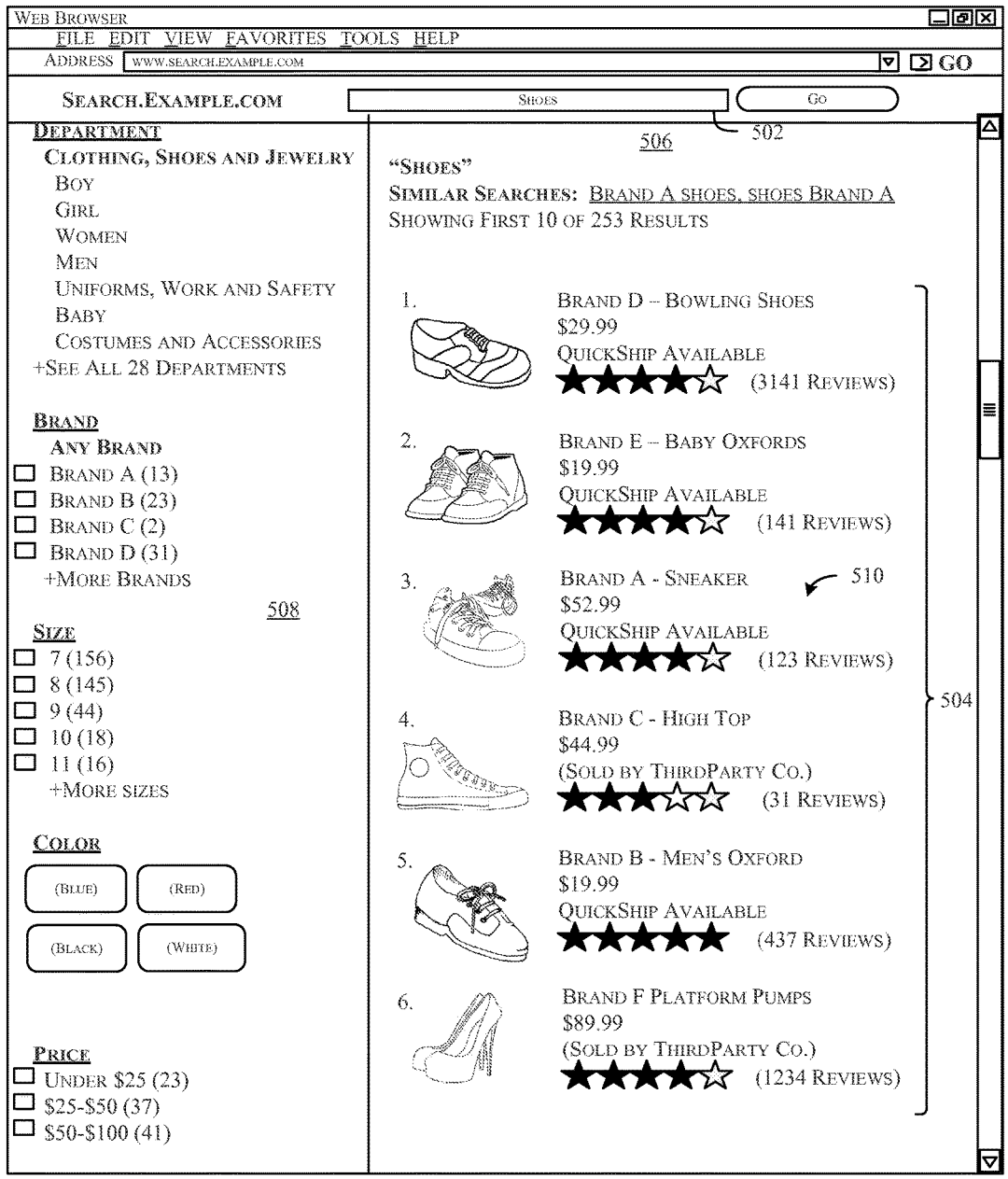
FIG. 5 is a schematic diagram illustrating another example interface suitable for implementing aspects of the dynamic query variations engine, in accordance with at least one embodiment.

FIG. 5 is a schematic diagram illustrating another example interface 500 suitable for implementing aspects of the dynamic query variations engine 102 of FIG. 1, in accordance with at least one embodiment. In at least one example, a user (e.g., the user 104 of FIG. 1) may enter a search query 502. ("shoes") via interface 500. As an initial inquiry, the dynamic query variations engine 102 may determine whether or not the query "shoes" matches a particular family of items. If the query matches a particular family of items, a process, as described in FIG. 6 may be executed.

In at least one example, the query may not match a particular family of items. In this case, a set of search results 504 may be determined and presented in search result pane 506. It should be appreciated that the set of search results 504 may be presented in search result pane 506 in the manner depicted in FIG. 5 (e.g., a vertical list), or the set of search results 504 may be arranged in a grid-like organization structure (e.g., with one or more rows of search result entries and one or more columns of search result entries) or any suitable organizational structure. Similarly, any example that is discussed here that is depicted in the figures as presenting search results in a list, may be equally applied to situations in which the set of search result entries are presented using another organization structure other than a list.

In at least one example, the search query 502 may be used to generate the set of search results 504. The set of search results 504 may include one or more items from each family of items (e.g., the corresponding families of parent objects 402 of FIG. 4) that best relate to the search query according to a relevancy score. Thus, item information associated with child object 406-1 of FIG. 4 may be selected as a most relevant item (for the family of parent object 402-1 of FIG. 4) and its information provided in a set of search results 504 (as depicted by entry 510), while information related to child object 406-2 and information related to child object 406-2 may be excluded from search results 504. In other examples, multiple items from a family may be included in the set of search results 504 according to a relevancy score indicating a relevance between an individual item and the search query.

In the example provided in FIG. 5, each item in the search results 504 are provided as a representative item of a family. In this case, it should be understood, that as the search results 504 are determined, multiple children of a family may appear throughout the list, according to a relevancy with the child to the submitted search query. Using traditional techniques each of the multiple children would be displayed as a separate entry in the search results 504.

As a side, graphical elements corresponding to various filters may be provided in filter pane 508 which allow the user to filter the set of search results 504 by selecting various filtering attributes (e.g., department, brand, size, color, and price) provided within filter pane 508.

Figure 6:
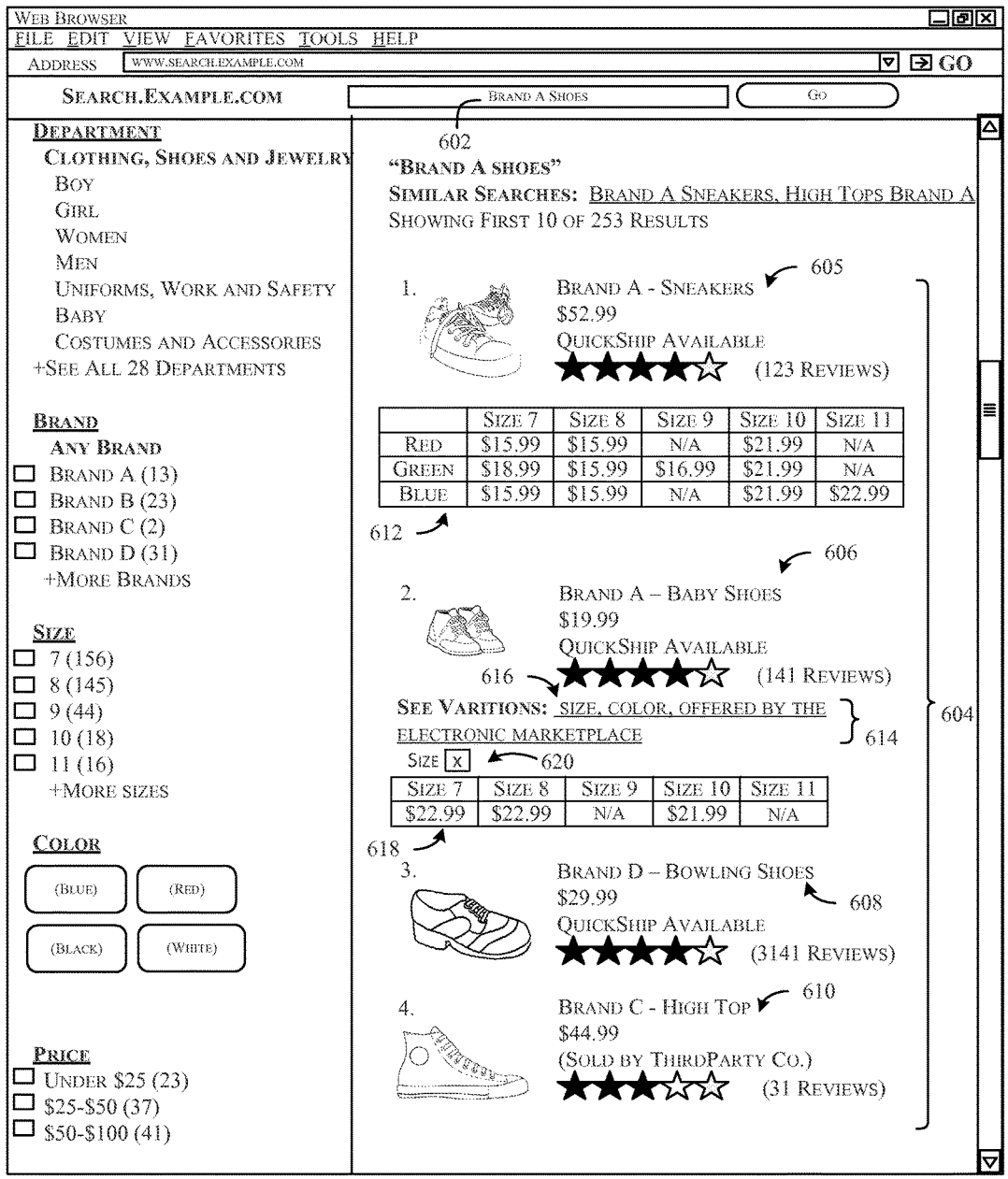
FIG. 6 is a schematic diagram illustrating an additional example interface suitable for implementing aspects of the dynamic query variations engine, in accordance with at least one embodiment.

FIG. 6 is a schematic diagram illustrating an additional example interface 600 suitable for implementing aspects of the dynamic query variations engine 102 of FIG. 1, in accordance with at least one embodiment.

In at least one example, a user (e.g., the user 104 of FIG. 1) may enter a search query 602 ("Brand A shoes") via interface 600 (e.g., the interface 500 of FIG. 5). A set of search results 604 may be determined (e.g., by query analysis engine 320 of FIG. 3) by executing query against an inventory stored in memory (e.g., the inventory data store 308 of FIG. 3). The query analysis engine 320 may analyze the search query 602 to determine a number of search result entries that correspond to a family of items that closely relates to the search query 602. For example, query analysis engine 320 may determine the entry 605 ("Brand A—Sneakers") and the entry 606 ("Brand A—Baby Shoes") are associated with a family of items that is more closely related to the search query 602 ("Brand A shoes") than a family associated with the entry 608, and a family associated with the entry 610 (e.g., families associated with "Brand D" and "Brand C", respectively).

In accordance with at least one embodiment, the query analysis engine 320 may utilize a mapping (e.g., provided by historical analysis engine 316 of FIG. 3) to determine a number of attribute categories that are most often utilized to narrow the search "Brand A shoes." As a non-limiting example, the mapping may indicate that users (or the user 104 of FIG. 1) who have searched for "Brand A shoes" have most often narrowed subsequent related search queries with words associated with "size" and "color." Accordingly, the query analysis engine 320 may utilize the entry 605 as a representative item for a number of child objects of the family. These corresponding child objects may be related to physical items initially included as additional entries in the set of search results. The set of search results may be condensed by removing the additional entries in the set of search results and associating the additional entries with the entry 605. The display manager 322 of FIG. 3 may utilize these associations to provide a graphical element (e.g., grid 612) as part of the entry 605. The grid 612 may include information (e.g., price and availability) related to the additional entries. Thus, the user 104 may view the information contained in the grid 612 to ascertain information related to additional entries instead of being forced to ascertain such information by scrolling through a longer search result list.

As another non-limiting example, utilizing the process described above, the display manager 322 may provide the user with a set of selectable options 614 related to a number of attribute categories for the entry 606. The grid 618 may not be displayed initially. The display manager 322 may receive an indication of a selection by the user 104 of option 616 (e.g., corresponding to a "size" attribute category). Upon receipt, the display manager 322 may remove the option 616 from the set of selectable options 614 and generate and provide the grid 618 to display information for various child object associated with the entry 606 according to size. Thus, the user 104 may ascertain what sizes are available for "Brand A Baby Shoes" by utilizing the grid 618. In at least one example, display manager 322 may provide the user 104 a removal option 620 corresponding to the option 616. Upon selection by the user 104 of removal option 620, the display manager 322 may remove the grid 618 and add the option 616 to the set of selectable options 614.

Figure 7:
FIG. 7 is a schematic diagram illustrating yet another example interface suitable for implementing aspects of the dynamic query variations engine, in accordance with at least one embodiment.

FIG. 7 is a schematic diagram illustrating yet another example interface 700 suitable for implementing aspects of the dynamic query variations engine 102 of FIG. 1, in accordance with at least one embodiment.

Continuing on with the example from FIG. 6, subsequent to selecting the option 616 of FIG. 6, the user 104 of FIG. 1 may select an option from the set of selectable options 702 provided by display manager 322 of FIG. 3. For example, the grid 618 may initially be displayed by display manager 322 with the set of selectable options 702. The display manager 322 may receive an indication of a selection by the user 104 of option 704 (e.g., corresponding to a "color" attribute category). Upon receipt, the display manager 322 may remove the option 704 from the set of selectable options 702 and generate, or otherwise provide, the grid 706 to display information for various child object associated with the entry 708 (e.g., the entry 606 of FIG. 6) according to size and color. Thus, the user 104 may ascertain what sizes and colors are available for Brand A Baby Shoes by utilized the grid 706. In at least one example, display manager 322 may provide the user 104 a removal option 710 corresponding to the option 704. Upon selection by the user 104 of removal option 710, the display manager 322 may remove the grid 706, regenerate or otherwise restore the grid 618 of FIG. 6, and add the option 704 to the set of selectable options 702.

Figure 8:
FIG. 8 is a schematic diagram illustrating still one further example interface suitable for implementing aspects of the dynamic query variations engine, in accordance with at least one embodiment.

FIG. 8 is a schematic diagram illustrating still one further example interface 800 suitable for implementing aspects of the dynamic query variations engine 102 of FIG. 1, in accordance with at least one embodiment.

Continuing on with the example from FIG. 7, subsequent to selecting the option 704 of FIG. 7, the user 104 of FIG. 1 may select an option from the set of selectable options 802 provided by display manager 322 of FIG. 3. For example, the grid 706 of FIG. 7 may initially be displayed by display manager 322 with the set of selectable options 802. The display manager 322 may receive an indication of a selection by the user 104 of the option 804 (e.g., corresponding to a merchant provider attribute category). Upon receipt, the display manager 322 may remove the option 804 from the set of selectable options 802 and generate, or otherwise provide, the grid 806 to display information for various child object associated with the entry 808 (e.g., the entry 708 of FIG. 7) according to a provider of the items. For example, the prices corresponding to the grid entries of grid 706 correspond to items provided by both first-party and third-party merchants. A first-party merchant may include the electronic marketplace provider. Thus, the user 104 may ascertain information about the available items provided by the electronic marketplace by utilizing the grid 806. In at least one example, display manager 322 may provide the user 104 a removal option 810 corresponding to the option 804. According to this example, upon selection by the user 104 of removal option 710, the display manager 322 may remove the grid 806, regenerate or otherwise restore the grid 706 of FIG. 7, and add the option 804 to the set of selectable options 802. It should be understood that display manager may generate additional grids (or other graphical elements) according to any suitable combination of user selections.

Figure 9:
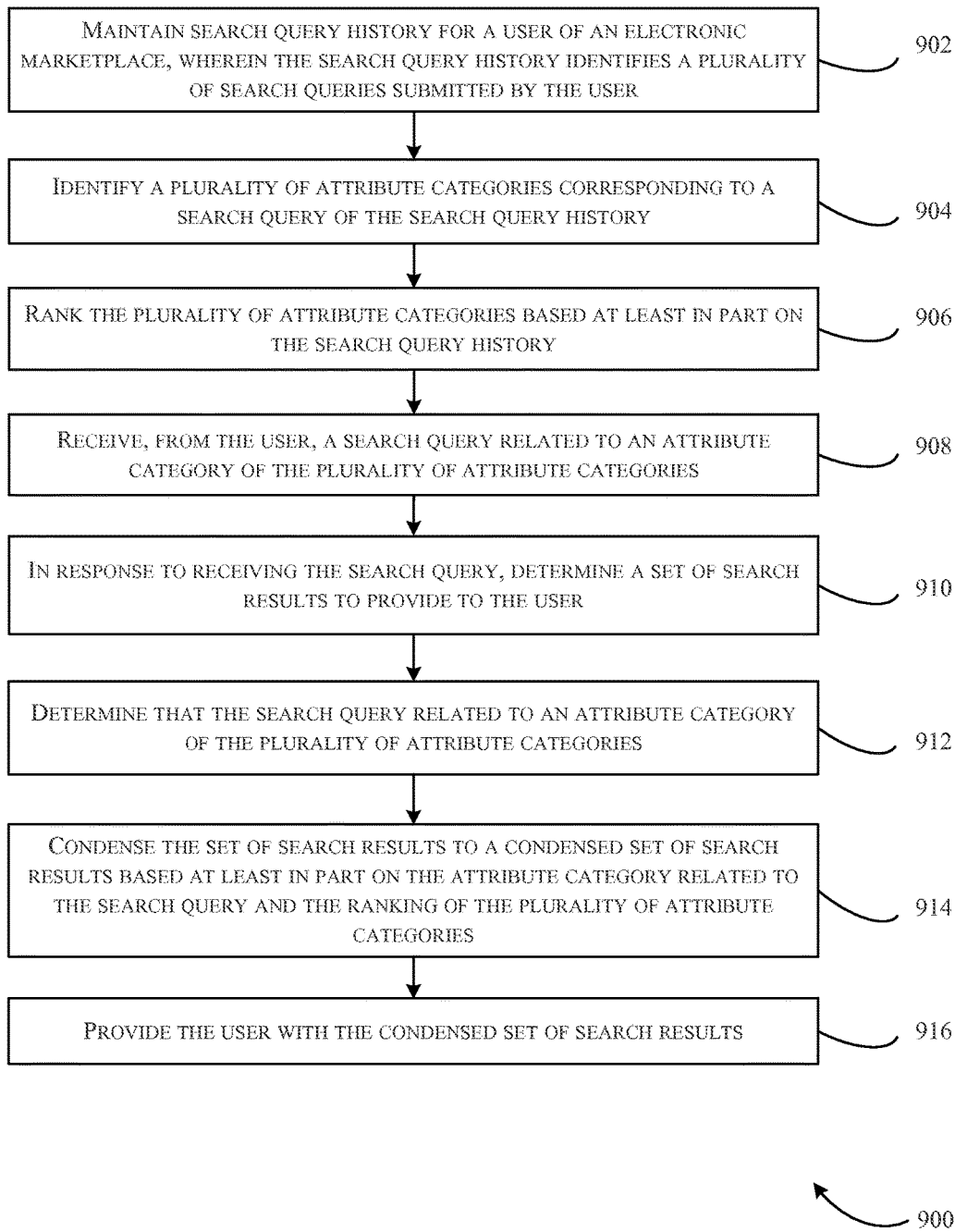
FIG. 9 is a flowchart illustrating a method for dynamically condensing a set of search results utilizing the dynamic query variations engine, in accordance with at least one embodiment.

FIG. 9 is a flowchart illustrating a method 900 for dynamically condensing a set of search results utilizing the dynamic query variations engine 102 of FIG. 1, in accordance with at least one embodiment. The method 900 may begin at block 902, where search query history for a user of an electronic marketplace may be maintained by one or more data processors (e.g., one or more data processors, such as hardware computer processors (e.g., 'CPUs'), executing instructions related to the dynamic query variations engine 102 of FIG. 1). For example, the historical analysis engine 316 may maintain search query history for users of the electronic marketplace. In at least one example, the search query history identifies one or more search queries submitted by users of the electronic marketplace.

At block 904, one or more attribute categories may be identified corresponding to a particular search query of the search query history (e.g., by the historical analysis engine 316 of FIG. 3). For example, the historical analysis engine 316 may parse a search query of the search query history to determine a relation between words included in the search query and an attribute category. The historical analysis engine 316 may utilize a predetermined mapping that associates a number of words, or groups of words, with a particular attribute category. For example, a predetermined mapping may indicate that the words "count," "ounce," "liter," "pack," and the like, may relate to a "quantity" attribute category. Similarly, the predetermined mapping may indicate that the words "mountain mist," "fresh linen," "mint," "floral," and the like, may relate to a "fragrance" attribute category. Thus, by identifying that the word "ounce" is contained in a search query, the historical analysis engine 316 may determine that the search query relates to the "quantity" attribute category.

At block 906, the plurality of attribute categories identified at block 904 may be ranked based at least in part on the search query history. For example, the historical analysis engine 316 may determine that, with respect to a particular search query, subsequent search queries contained words corresponding to a "size" attribute category 50 times. Similarly, words corresponding to a "fragrance" attribute category may be determined to have been used 30 times in the subsequent search queries. Accordingly, the historical analysis engine 316 may maintain a search query profile for the particular search query that includes the "size" and "fragrance" attribute categories with corresponding utilization counts.

At block 908, a search query may be received from a user (e.g., by the query analysis engine 320 of FIG. 3). The query analysis engine 320 may determine that the search query, relates to an attribute category of the plurality of attribute categories. In at least one example, the query analysis engine 320 retrieves a search query profile corresponding to the received search query (e.g., from search query data store 310 of FIG. 3).

At block 910, a set of search results may be determined in response to receiving the search query at block 908. For example, the query analysis engine 320 may execute the search query received at block 908 against an inventory of items (e.g., an inventory of items stored on inventory data store 308 of FIG. 3). A set of search results may be obtained as a result of the execution.

At block 912, the query analysis engine 320 may determine that the search query relates to an attribute category of the plurality of attribute categories. In at least one example, the query analysis engine 320 may retrieve a search query profile for the search query received at block 908. The search query profile may indicate an attribute category identified by the historical analysis engine 316 at block 904. As discussed above with respect to block 906, the search query profile may include a ranking of the attribute categories identified by the historical analysis engine 316.

At block 914, the set of search results may be condensed to a condensed set of search results based at least in part on the attribute category related to the search result and the ranking of the plurality of attribute categories. The query analysis engine 320 may determine a subset of the set of search results that correspond to items that are, essentially, the same item, but vary according to the attribute category. For example, the query analysis engine 320 may determine that multiple search result list entries relate to a particular laundry detergent and that the multiple search result list entries correspond to items of various sizes (e.g., a 32 oz. bottle of detergent, a 64 oz. bottle of detergent, etc.). The query analysis engine 320 may determine a representative search query entry for the multiple search result list entries that relate to the particular laundry detergent. Information corresponding to the multiple search result list entries may be associated with the representative search query entry. The query analysis engine 320 may remove the multiple search result list entries from the set of search results.

At block 916, the condensed set of search results may be provided to the user. For example, the display manager 322 of FIG. 3 may generate a grid, or other suitable graphical element, to display the information associated with the representative search query. The grid may be provided with the representative search query entry and displayed to the user along with the remaining entries in the set of search results.

Figure 10:
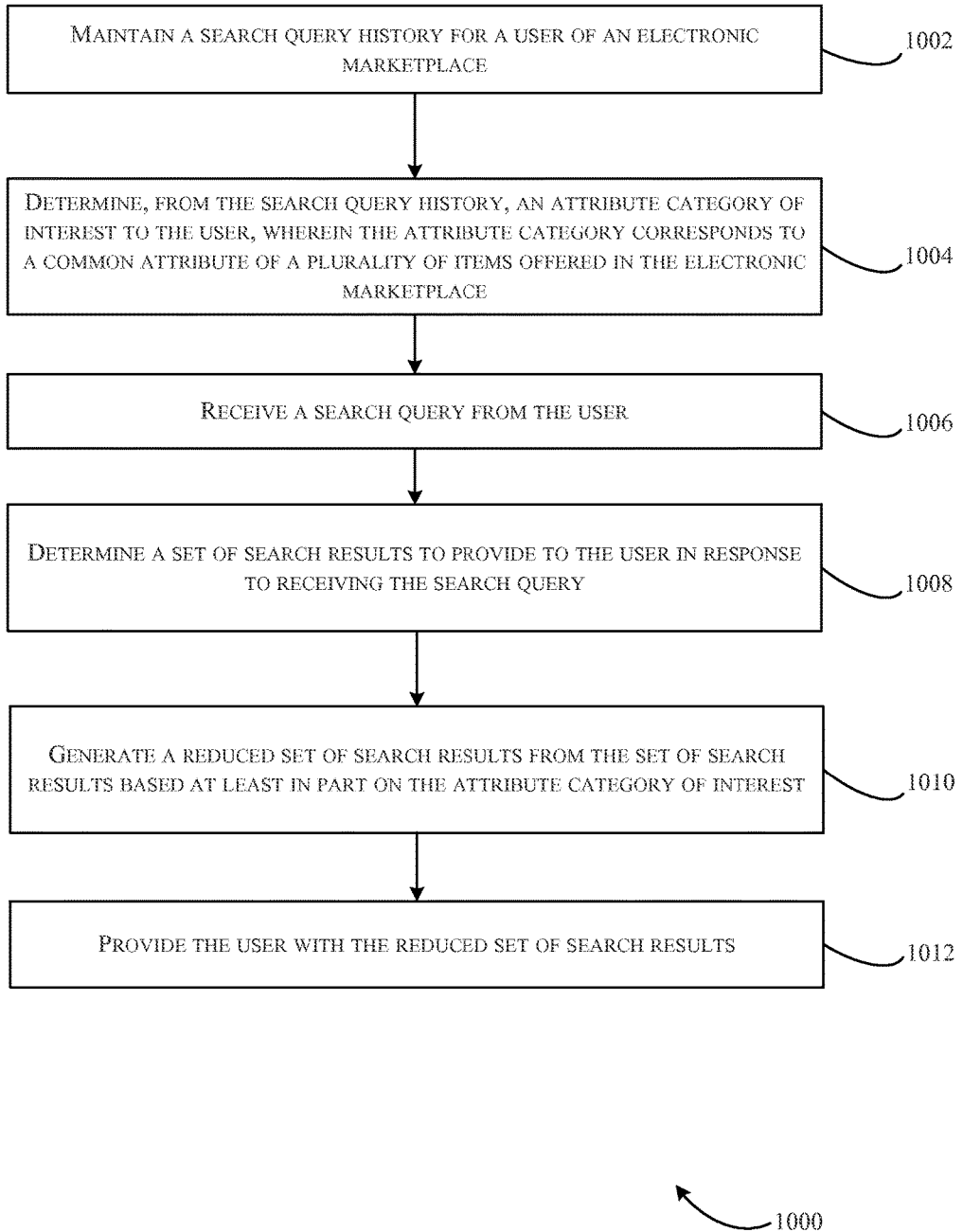
FIG. 10 is a flowchart illustrating another method for dynamically condensing a set of search results utilizing the dynamic query variations engine, in accordance with at least one further embodiment.

FIG. 10 is a flowchart illustrating another method 1000 for dynamically condensing a set of search results utilizing the dynamic query variations engine 102 of FIG. 1, in accordance with at least one embodiment. The method 1000 may begin at block 1002, where a search query history may be maintained for a user of an electronic marketplace. For example, the historical analysis engine 316 of FIG. 3 may be utilized to maintain search query history for an individual user in a similar manner described with respect to FIG. 9.

At block 1004, an attribute category of interest to the user may be determined. In at least one example, the attribute category may correspond to a common attribute of a plurality of items offered in the electronic marketplace. For example, the historical analysis engine 316 may determine that the user often narrows his search results with words that correspond to a "fragrance" attribute category and words that correspond to a "quantity" attribute category. In this manner, the historical analysis engine 316 may rank a set of attribute categories according to a frequency at which the user narrows his search results with words corresponding to each attribute category. As the frequency at which the user narrows his searches increases (e.g., utilizing words corresponding to a particular attribute category), so to shall the ranking increase (e.g., the ranking assigned to the particular attribute category).

At block 1006, a search query may be received from the user. The search query, in some examples, may be received by the query analysis engine 320 of FIG. 3.

At block 1008, in response to receiving the search query at block 1006, the query analysis engine 320 may determine a set of search results to provide to the user. For example, the query analysis engine 320 may execute the received search query against an inventory of items (e.g., stored in inventory data store 308 of FIG. 3). A set of search results may be returned in response to the execution.

At block 1010, a reduced set of search results may be generated from the set of search results. The reduced set of search results may be based at least in part on the attribute category of interest. For example, the user may often narrow his searches based on words corresponding to a "quantity" attribute category. The query analysis engine 320 may utilize such information to select a representative entry for multiple search result entries. The multiple search result entries may correspond to a same item offered in different quantities. The multiple search result entries may be removed from the search result list and the information for such entries associated with the representative entry. This process of determine a representative entry, removing multiple entries, and associating the information for the multiple entries with the representative entry may be performed any suitable number of times during the process of generating the reduced set of search results.

At block 1012, the reduced set of search results may be provided to the user. For example, the display manager 322 may generate a grid, or other suitable graphical element, to display the associated information for the representative entry, along with the remaining set of search result entries.

Figure 11:
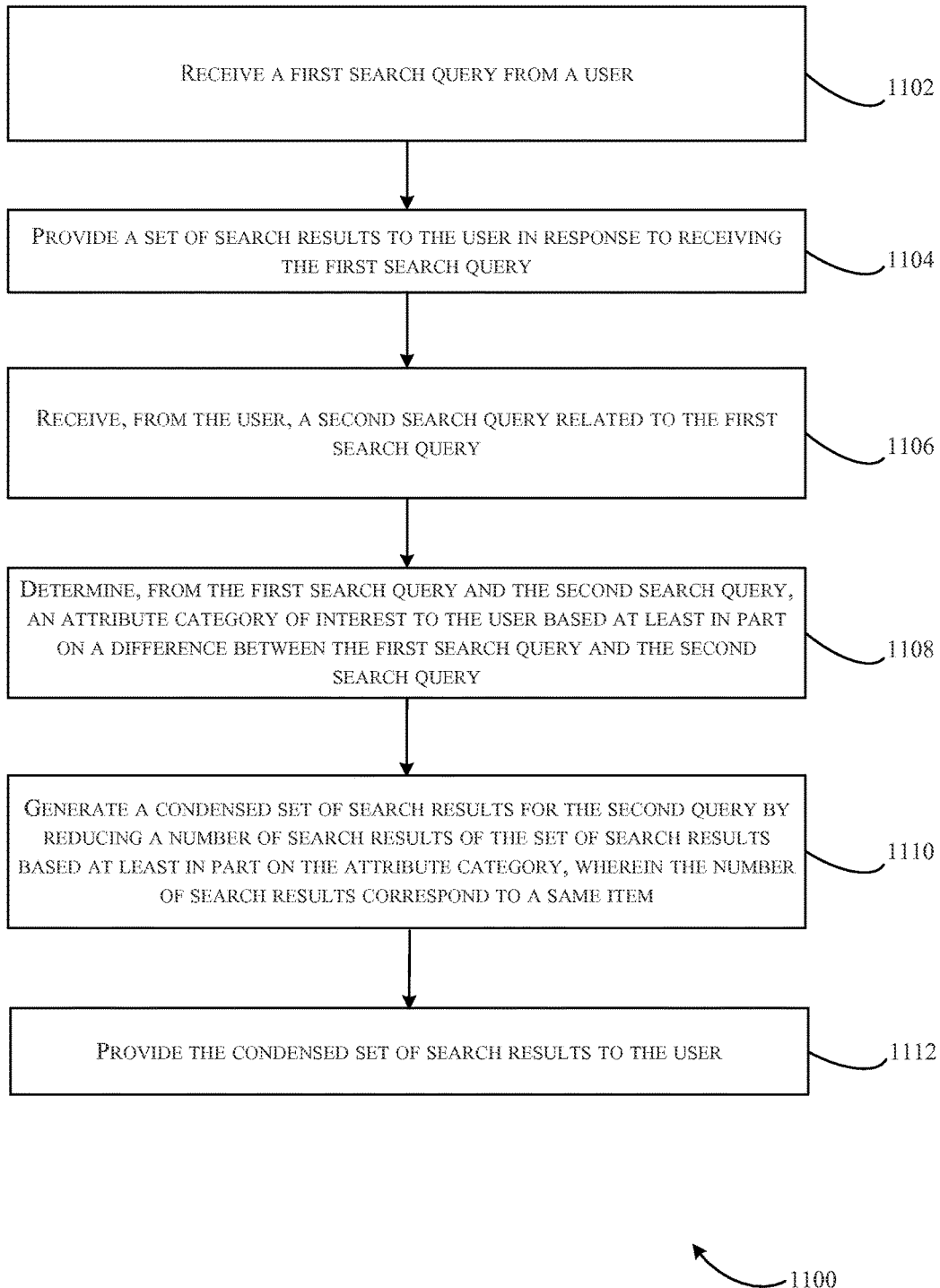
FIG. 11 is a flowchart illustrating an additional method for dynamically condensing a set of search results utilizing the dynamic query variations engine, in accordance with at least one further embodiment.

FIG. 11 is a flowchart illustrating an additional method 1100 for dynamically, condensing a set of search results utilizing the dynamic query variations engine 102 of FIG. 1, in accordance with at least one embodiment. The method 1100 may begin at block 1102, a first search query may be received from a user. The first search query (e.g., "shoes") may be related to a first item (e.g., an item offered in an electronic marketplace). The first search query may be received by the query analysis engine 320 of FIG. 3 and stored in a suitable data store (e.g., search query data store 310 of FIG. 3).

At block 1104, a set of search results may be provided to the user in response to receiving the first search query. The set of search results may be obtained by the query analysis engine 320 by executing the first search query against an inventory of items offered by the electronic marketplace (e.g., stored in inventory data store 308 of FIG. 3). The set of search results may be provided to the user by display manager 322 of FIG. 3.

At block 1106, a second search query related to the first search query may be received for the user. For example, the first search query "shirts" may be followed by the second related search query "red shirts." The second search query may be received by the query analysis engine 320 and stored in the search query data store 310.

At block 1108, an attribute category of interest for the user may be determined from the first search query and the second query. The attribute category of interest may be determined based at least in part on a difference between the first search query and the second search query. For example, the historical analysis engine 316 of FIG. 3 may determine that the second search query varies from the first search query by including the words "red." The historical analysis engine 316 may determine (e.g., utilizing a predetermined mapping) that the word "red" corresponds to a "color" attribute category. Accordingly, the historical analysis engine 316 may identify the "color" attribute category as a category of interest to the user.

At block 1110, a condensed set of search results for the second query may be generated by reducing a number of search results of the set of search results based at least in part on the attribute category. The number of search results may correspond to a same item. For example, the query analysis engine 320 may utilize the category of interest identified at block 1108 to identify numerous search results that correspond to the same item offered in various colors. Accordingly, the query analysis engine 320 may select a representative search result entry for the same item and associate information related to the numerous search results with the representative search result entry. The query analysis engine 320 may reduce the number of search results of the set of search results then removing the entries corresponding to the numerous search results.

At block 1112, the condensed set of search results may be provided to the user. For example, the display manager 322 may generate a grid, or other suitable graphical element, to display the associated information for the representative entry, along with the remaining set of search result entries in the condensed set of search results. In this example, instead of being presented with separate search result entries corresponding to a red shirt, a blue shirt, and a green shirt, etc., the user may view a single search result entry to determine various shirt colors offered.

Figure 12:
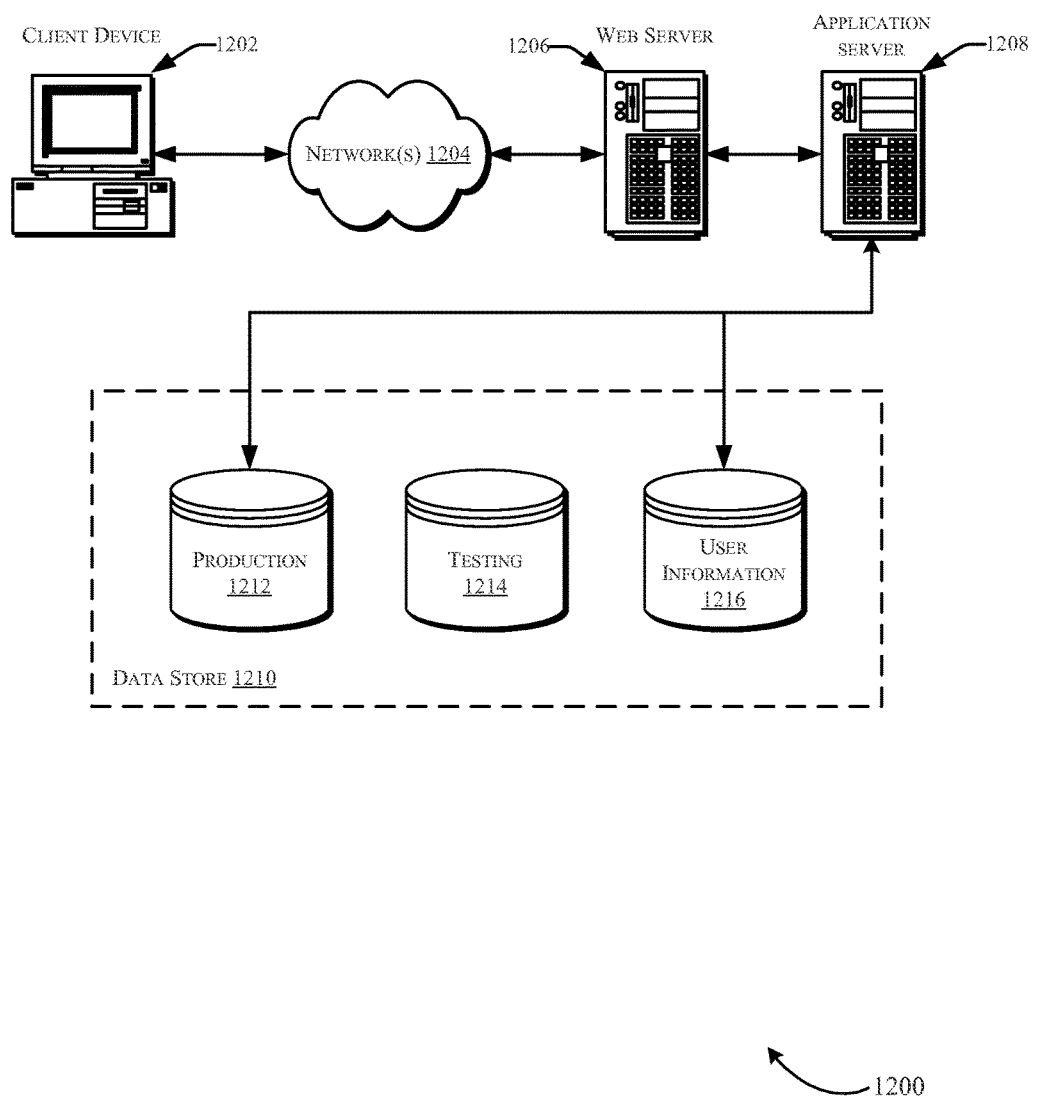
FIG. 12 is a schematic diagram illustrating an example environment for implementing aspects in accordance with at least one embodiment described herein.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes a user device 1202 (e.g., an electronic client device), which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1202 and the at least one application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the at least one application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the environment 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Peril, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk ("DVD"), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

maintaining, by one or more data processors, a search query history of a user of an electronic marketplace, wherein the search query history identifies a plurality of historical search queries submitted by the user;

identifying an initial search query of the plurality of historical search queries and a subsequent search query of the plurality of historical search queries, the subsequent search query being related to an initial search query, the subsequent search query historically being provided after the initial search query;

determining an attribute category based at least in part on a comparison of the initial search query and the subsequent search query;

receiving, from the user, a new search query;

in response to receiving the new search query, determining an initial set of search results;

identifying at least two search results of the initial set of search results based at least in part on determining that the at least two search results are individually associated with respective attribute values corresponding to the attribute category;

generating, by the one or more data processors, a graphical element that presents the corresponding attribute values of the at least two search results of the initial set of search results;

formatting, by the one or more data processors, a user interface that presents the at least two search results of the initial set of search results as a single search result entry, the single search results entry comprising the graphical element that presents the corresponding attributes values of the at least two search results; and presenting, by the one or more data processors, the user interface comprising the graphical element.

2. The computer-implemented method of claim 1, wherein identifying an attribute category comprises:
   determining that a difference between the initial search query and the subsequent search query corresponds to the attribute category; and
   maintaining an association between the user and the attribute category.

3. The computer-implemented method of claim 1, further comprising:
   maintaining, by one or more data processors, global search query history for a plurality of users of the electronic marketplace, wherein the global search query history comprises a plurality of search queries historically submitted by the plurality of users, wherein the attribute category is identified further based at least in part on the plurality of search queries historically submitted by the plurality of users.

4. The computer-implemented method of claim 1, wherein identifying the attribute category further comprises analyzing instances of the search query history of the user, the instances of the search query history indicating that the user submitted a narrowed search query subsequent to submitting a broader search query.

5. The computer-implemented method of claim 1, further comprising:
   identifying a second attribute category for a third search query of the plurality of historical search queries, the second attribute category being identified based at least in part on determining that the third search query was provided to narrow a previously-provided search query of the plurality of historical search queries;
   identify a second subset of search results of the set of initial search results based at least in part on determining that the second subset of search results are individually associated with additional respective attribute values corresponding to the second attribute category; and
   formatting, by the one or more data processors, the user interface to present the at least two search results of the initial set of search results and the second subset of search results of the initial set of search results as the single search result entry, wherein the graphical element is generated to further comprise the additional respective attribute values corresponding to the second attribute category.

6. The computer-implemented method of claim 1, wherein the graphical element is generated to further comprise a plurality of selectable options corresponding to a plurality of attribute categories, wherein receiving input indicating a selection of one of the plurality of selectable options causes the one or more data processors to modify the graphical element presented at the user interface, the graphical element being modified to comprise different attribute values of the at least two search results of the initial set of search results according to the selection.

7. A system, comprising:
   a processor; and
   a memory storing computer-executable instructions that, when executed with the processor, cause the system to at least:
     maintain a search query history associated with a user of an electronic marketplace, the search query history comprising a plurality of historical search queries previously provided by the user;
     determine, an attribute category based at least in part on the plurality of historical search queries, the attribute category being determined based at least in part on a comparison between an initial search query of the plurality of historical search queries and a subsequent search query of the plurality of historical search queries, the subsequent search query being related to the initial search query and provided subsequent to the initial search query;
     receive a search query from the user;
     determine a set of search results to provide to the user in response to receiving the search query;
     identify at least two search results of the set of search results based at least in part on determining that the at least two search results are individually associated with respective attribute values corresponding to the attribute category;
     format a user interface to present the at least two search results as a single search result entry, the single search results entry comprising a graphical element that presents the respective attributes values of the at least two search results; and
     present the user interface comprising the graphical element.

8. The system of claim 7, wherein the instructions that format the user interface to present the at least two search results as a single search result entry, further cause the system to at least:
   determine that the at least two search results relate to a common item; and
   identify a representative image corresponding to the common item, wherein the user interface is formatted to further present the representative image with the graphical element.

9. The system of claim 8, wherein the memory includes further instructions that, when executed with the processor, cause the system to at least:
   determine, from the search query history associated with the user, a plurality of attribute categories of interest, the plurality of attribute categories of interest comprising the category of interest; and
   rank the plurality of attribute categories based at least in part on a number of occurrences for which the user narrowed a previously-provided search query according to a particular attribute category of the plurality of attribute categories.

10. The system of claim 9, wherein the memory includes further instructions that, when executed with the processor, cause the system to at least:
    format the user interface to further present a plurality of selectable options corresponding to the plurality of attribute categories within the single search result entry, wherein the plurality of selectable options are based at least in part on the rank.

11. The system of claim 7, wherein the instructions that determine the attribute category include instructions that, when executed with the processor, cause the system to at least:
    identify the initial search query of the user from the search query history;
    identify the subsequent search query of the user from the search query history, the subsequent search query being identified based at least in part on a determination that the subsequent search query relates to the initial search query;
    determine a difference between the initial search query and the subsequent search query;

determine attribute category of interest based at least in part on the difference and a set of predetermined attribute categories; and maintain a record indicating that the user has provided at least one narrowing search query associated with the attribute category.

12. The system of claim 11, wherein the memory includes further instructions that, when executed with the processor, cause the system to at least:

maintain global search query history for a plurality of users of the electronic marketplace, wherein the global search query history includes a plurality of search queries historically submitted by the plurality of users.

13. The system of claim 12, wherein the instructions that determine the attribute category include instructions that, when executed with the processor, cause the system to at least:

identify a first query from the global search query history;

identify a second query from the global search query history, the second query being identified based at least in part on determining that the second query relates to the first query and that the second query was provided subsequent to the first query;

determine a difference between the first query and the second query;

determine a preferred attribute category based at least in part on the difference and a set of predetermined attribute categories; and maintain a record indicating that at least one of the plurality of users has provided a narrowing search query that narrowed a previously-submitted search query according to the preferred attribute category.

14. A computer-implemented method, comprising:

receiving, by one or more data processors, a first search query from a user;

providing, by the one or more data processors, a set of search results to the user in response to receiving the first search query;

receiving, by the one or more data processors, from the user, a second search query related to the first search query;

determining, by the one or more data processors from the first search query and the second query, an attribute category based at least in part on a comparison of the first search query and the second search query;

determining, by the one or more data processors, an initial set of search results for the second query;

identifying, by the one or more data processors, at least two of search results from the initial set search results for the second query, the at least two search results being identified based at least in part on being associated with corresponding attribute values related to the attribute category;

formatting, by the one or more data processors, a user interface that presents the at least two search results as a single search result entry, the single search result entry comprising a graphical element that presents the corresponding attributes values of the at least two search results; and presenting the user interface comprising the graphical element.

15. The computer-implemented method of claim 14, wherein the attribute category corresponds to one of a size, a title, an item identifier, a fragrance, a color, a price, a quantity, a brand, or a merchant.

16. The computer-implemented method of claim 14, further comprising:

determining a plurality of attribute categories based at least in part on search result history of the user, the plurality of attribute categories comprising the attribute category;

providing the single search result to the user with a plurality of options corresponding to the plurality of attribute categories;

receiving, from the user, a selection of an option of the plurality of options; and updating the single search result entry of the user interface to present different information related to another attribute category different from the attribute category.

17. The computer-implemented method of claim 14, further comprising:

determining a plurality of attribute categories based at least in part on global search result history associated with a plurality of users;

providing the single search result entry to the user with a plurality of options corresponding to the plurality of attribute categories;

receiving, from the user, a selection of a particular attribute category of the plurality of attribute categories; and updating the single search result entry to provide different information of the at least two search results according to the particular attribute category selected.

18. The computer-implemented method of claim 17, wherein updating the single search result entry to provide the different information of the at least two search results, the different information being related to the particular attribute category.

19. The computer-implemented method of claim 17, wherein the single search result entry provides indications of the corresponding attributes values of the at least two search results and the different information of the at least two search results in a grid.

* * * * *